G. W. FISH.
MITER BOX.
APPLICATION FILED DEC. 2, 1910.
1,002,980.
Patented Sept. 12, 1911.
2 SHEETS—SHEET 1.
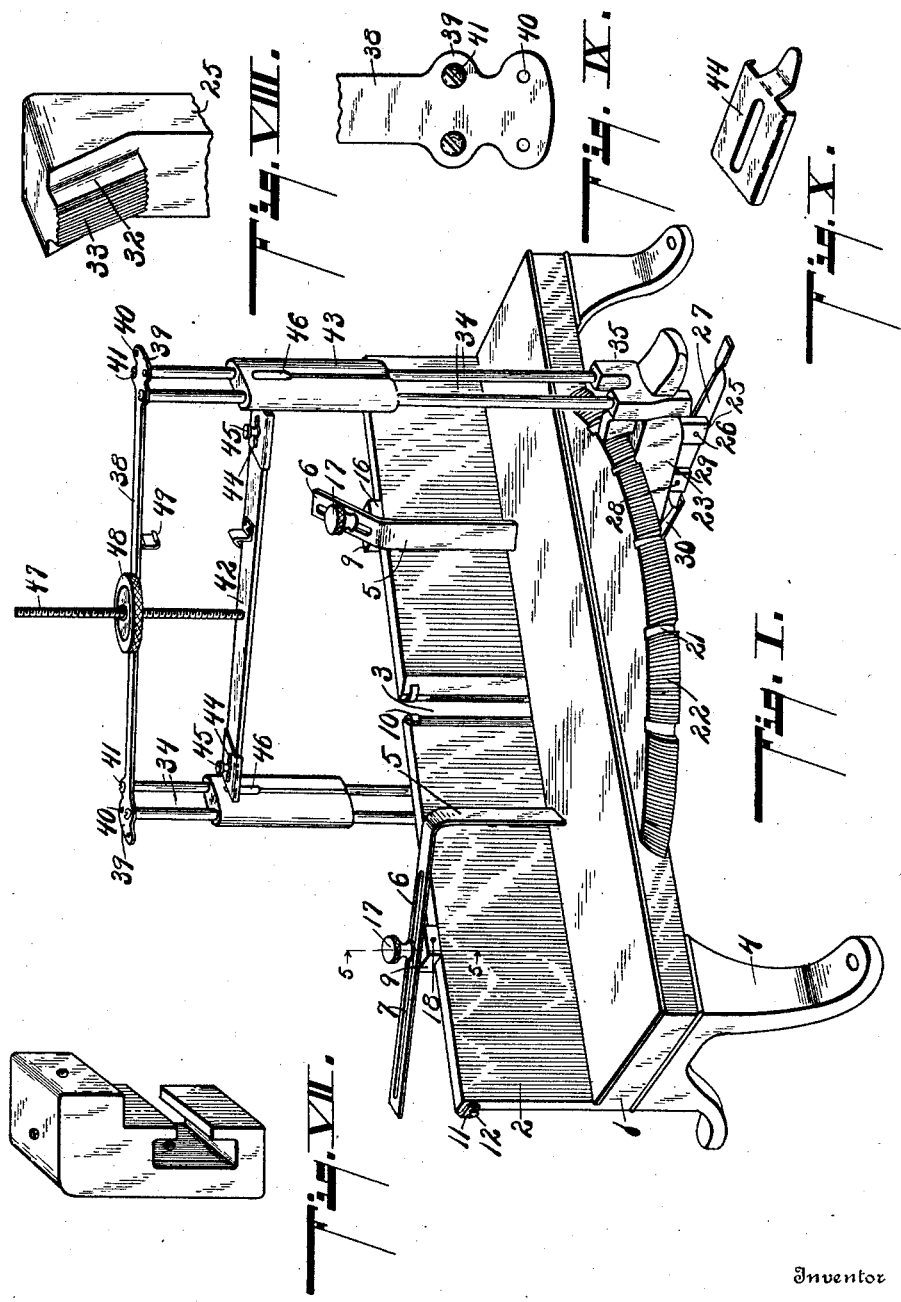

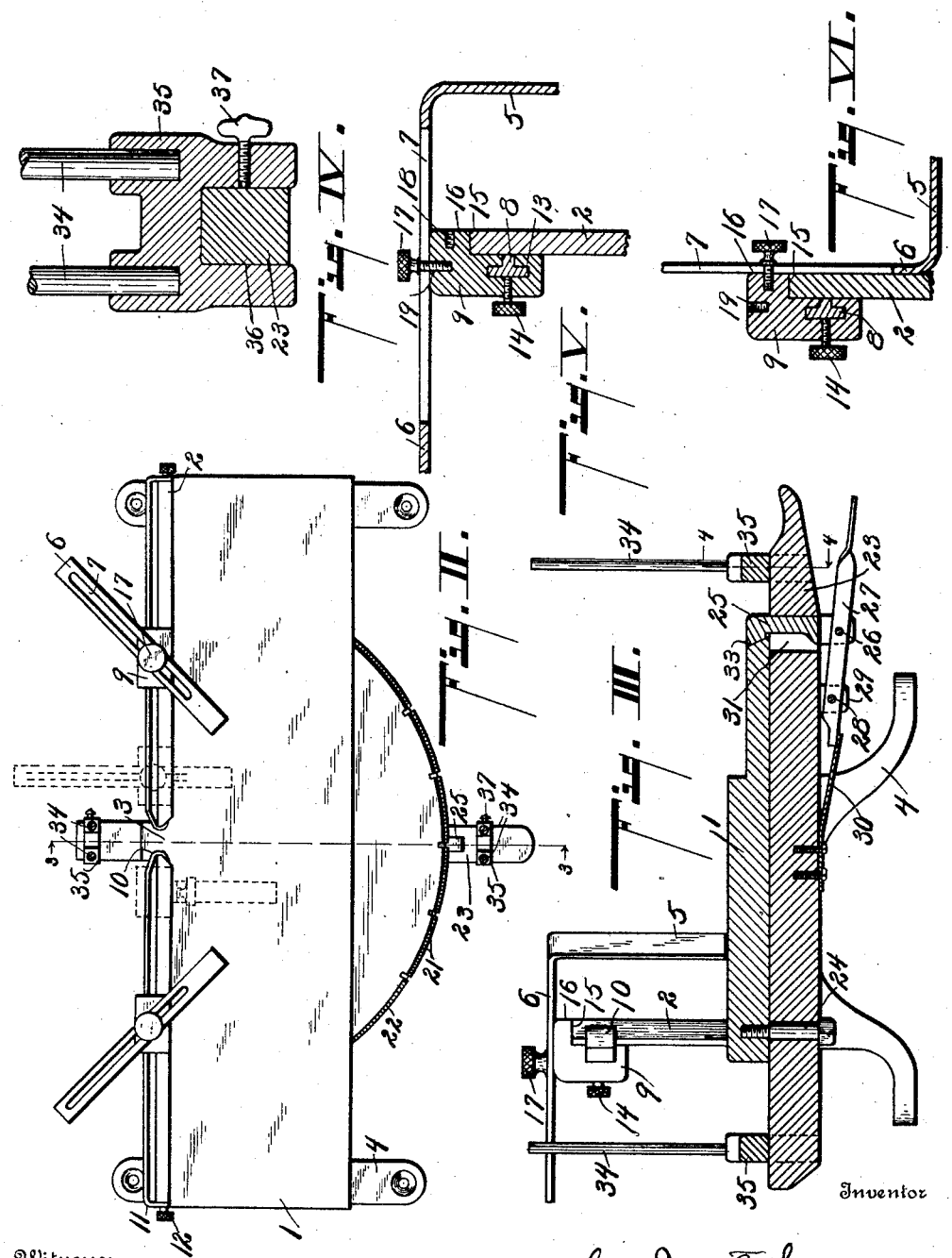

UNITED STATES PATENT OFFICE.

GEORGE W. FISH, OF KALAMAZOO, MICHIGAN.

MITER-BOX.

1,002,980. Specification of Letters Patent. Patented Sept. 12, 1911.

Application filed December 2, 1910. Serial No. 595,239.

*To all whom it may concern:*

Be it known that I, GEORGE W. FISH, a citizen of the United States, residing at Kalamazoo, Michigan, have invented certain new and useful Improvements in Miter-Boxes, of which the following is a specification.

This invention relates to improvements in miter boxes.

The main objects of this invention are: First, to provide in a miter box an improved work holder or clamp. Second, to provide in a miter box an improved work holder by which the work of various kinds may be securely held, or work held in various relations to the saw. Third, to provide in a miter box an improved saw guide. Fourth, to provide in a miter box an improved means for detachably supporting the saw guide.

Further objects, and objects relating to structural details, will definitely appear from the detailed description to follow.

I accomplish the objects of my invention by the devices and means described in the following specification.

The invention is clearly defined and pointed out in the claims.

A structure, which is a preferred embodiment of my invention, is clearly illustrated in the accompanying drawing, forming a part of this specification, in which:

Figure 1 is a front perspective of a structure embodying the features of my invention. Fig. 2 is a plan view thereof, with the saw carrier post and the saw carrier broken away, the work clamps being shown in one position by full lines and in another by dotted lines. Fig. 3 is a detail vertical section taken on a line corresponding to line 3—3 of Fig. 2, the saw carriers being omitted. Fig. 4 is an enlarged detail vertical section taken on a line corresponding to line 4—4 of Fig. 3, showing the connection for the guide post base to its supporting bar. Fig. 5 is a detail vertical section through one of the work clamps and its supports, taken on a line corresponding to line 5—5 of Fig. 1. Fig. 6 is a similar view with the work clamp adjusted to bring its work-engaging arm in a horizontal position, it being shown in a vertical position relative to the base 1 in the other figures. Fig. 7 is a perspective view of the work clamp supporting member 9. Fig. 8 is an enlarged detail perspective view of the engaging member of the saw guide supporting bar latch. Fig. 9 is a detail plan of the saw guide posts and post bar 38. Fig. 10 is a perspective view of one of the carrier bar clamp members 44.

In the drawing, similar reference characters refer to similar parts throughout the several views, and the sectional views are taken looking in the direction of the little arrows at the ends of the section lines.

Referring to the drawing, the miter box illustrated consists of a base 1, having a back plate 2 thereon. The back plate is provided with a central vertical saw slot 3, as is common in miter boxes of this type. The base is provided with suitable legs, as 4. I provide a pair of my improved work clamps and supports therefor, mounted one on each side of the saw slot 3 of the back plate, so that they may be adjusted relative to and coact with each other in supporting or clamping the work. However, as these work clamps and their supports are, in the structure illustrated, duplicates, I will describe only one of them in detail.

My improved work clamp is preferably L-shaped, having a work engaging arm 5 and a supporting arm 6 arranged at substantially right angles to each other. The supporting arm 6 is provided with a longitudinal slot 7. The support for the work clamp comprises a bar 8, mounted on the rear side of the back plate, and a supporting member 9 mounted on the bar. The bar is preferably a T-bar, as illustrated, and is provided with means for detachably securing it to the back plate, so that it may be used as an attachment, the means in the structure illustrated consisting of the hooks 10 and 11 at the ends of the bar, the inner hook 10 engaging in the saw slot, and the outer hook being provided with a set screw 12 by which the bar 8 is clamped in place.

The supporting member 9 is provided with a T-shaped slot 13 adapted to receive the bar, and is slidably mounted thereon so that it may be adjusted to and from the saw guide of the back plate. A clamping screw 14 is provided for securing the member 9 in its adjusted positions. The member 9 is shouldered at 15 to engage the top of the back plate, its forward edge 16 being flush with the face of the back plate.

The clamping screw 17 for the work clamp is adapted to be engaged either in the threaded hole 18 in the front edge of the member 9, or in the hole 19 in its top so that the supporting arm of the work clamp may be clamped upon the top of the member 9, as shown in Figs. 1, 2, 3 and 4 of the drawing, or against its front edge and against the face of the back plate, as shown in Fig. 6.

The member 8 may be adjusted toward and from the saw guide according to the kind of work it is desired to hold, or the position in which it is desired to hold it, one clamp being shown in dotted lines close to the saw slot in Fig. 2 with its work-engaging arm in a vertical position and the other with its work-engaging arm in a horizontal position.

The two clamping members, arranged one on either side of the slot, can be adjusted so that they hold or support the work at various angles, or in various positions, or various kinds or shapes of work, the two effectively coacting in securing the work. For certain work one clamp is all that is required. The work clamps may be used merely as gage or work positioning members. I use the term "work clamps" herein, as they are primarily designed to clamp or hold the work securely in position. These members are, however, of great advantage when used merely as gages or positioning members. The adjustment of the clamps to and from the saw guide or the saw slot of the back plate is a very desirable feature in adapting the clamps for various kinds of work. Further, by this adjustment, the clamps may be adjusted to a position which will most effectively clamp the work,—that is, the strain or leverage on the clamping screws is minimized.

I preferably provide the structure with my improved gage, which consists of a gage segment, having main gage notches 21 and auxiliary serration-like notches 22 therein, the auxiliary serration-like gage notches 22 being intermediate of the notches 21. The saw guide support bar 23 is pivoted at 24 to the under side of the base 1. The engaging member 25 of the latch is pivoted at 26 on the finger piece 27. The finger piece is pivoted at 28 on the ears 29 on the under side of the base. A spring 30 is arranged to engage one end of the finger piece, and adapted to hold the latch normally downward.

The engaging member 25 of the latch is arranged through the hole 31 in the bar 23. The engaging member is provided with an engaging lug 32 adapted to enter the notches 21 of the gage segment. The face of the engaging lug 32 is provided with a plurality of serrations 33 adapted to engage the serrations 22. The gage segment is, in practice, provided with suitable scale indicia not here shown.

The saw guide carrier posts 34 are provided with forked bases 35, which engage vertical opposed grooves 36 in the bar 23, set screws 37 being provided for detachably securing the post base on the bar. This provides a structure which can be readily assembled or disassembled, so that it can be knocked down for transportation purposes, or the saw guide portion provided as an attachment.

The saw guide illustrated is, in some respects, a modification of that of my Patent No. 955,145, of April 19, 1910. The structure, as illustrated, consists of a post bar 38, which is adapted to rest on the top of the posts, it being provided with laterally-projecting ears 39 having screw holes 40 therein, there being a plurality of these ears so that the saw guide may be used as an attachment for different sizes of miter boxes. The post bar 38 is secured by means of the screws 41 tapped longitudinally into the post, (see details in Fig. 9). The carrier bar 42 is connected to the saw carriers 43, which are slidably mounted upon the post by means of the clamps 44. These clamps are preferably channel-shaped to embrace the bar 42, and adjustably secured by means of the set screws 45. The clamping members are provided with tongues engaging the openings 46 in the saw carriers. The gage rod 47 is carried by the carrier bar and arranged through the post bar, as illustrated. The stop 48 is threaded upon the gage rod. The gage 49 is provided for holding the carrier bar in its elevated position.

I have illustrated and described my improvements in detail in a simple embodiment, and although I am aware that considerable structural variations are possible without departing from my invention, I have not attempted to illustrate or describe the various modifications herein, as they will no doubt suggest themselves to those skilled in the art to which this invention relates. I desire, however, to be understood as claiming my improvements specifically in the form illustrated, as well as broadly within the scope of the appended claims.

Having thus described my invention, what I claim as new and desire to secure by Letters Patent is:

1. In a miter box, the combination with a base, a back plate and a saw guide, of an L-shaped work clamp having a longitudinal slot in its supporting arm, the other arm being the work engaging arm, a support for said work clamp comprising a T-bar having hooks at its ends adapted to engage the vertical edges of said back plate, one of the hooks being provided with a clamping screw whereby said bar is detachably secured in a horizontal position on the rear side of said back plate, a block having a T-shaped bar engaging slot therein, slidably mounted on said bar, said block being shouldered to engage the upper edge of said back plate, its forward edge being flush with the face of the back plate, a clamping screw for adjustably securing said block to said bar, and a clamping screw for said supporting arm arranged through the slot therein, the top and forward edge of said block being adapted to receive said clamping screw whereby said work clamp may be adjustably secured with its supporting arm clamped against the face of said back plate, or against the top of said block, as desired.

2. In a miter box, the combination with a base, a back plate and a saw guide, of an L-shaped work clamp having a longitudinal slot in its supporting arm, the other arm being the work engaging arm, a support for said work clamp comprising a bar secured in a horizontal position on the rear side of said back plate, a block having a bar engaging slot therein, slidably mounted on said bar, said block being shouldered to engage the upper edge of said back plate, its forward edge being flush with the face of the back plate, a clamping screw for adjustably securing said block to said bar, and a clamping screw for said supporting arm arranged through the slot therein, the top and forward edge of said block being adapted to receive said clamping screw whereby said work clamp may be adjustably secured with its supporting arm clamped against the face of said back plate, or against the top of said block, as desired.

3. In a miter box, the combination with a base, a back plate and a saw guide, of an L-shaped work clamp having a longitudinal slot in its supporting arm, the other arm being the work engaging arm, a support therefor comprising a T-bar having hooks at its ends adapted to engage the vertical edges of said back plate, one of the hooks being provided with a clamping screw whereby said bar is detachably secured in a horizontal position on the rear side of said back plate, a block having a T-shaped bar engaging slot therein, slidably mounted on said bar to be adjusted toward and from said saw guide, a clamping screw for adjustably securing said block to said bar, and a work clamp clamping screw carried by said block arranged through the slot of said supporting arm.

4. In a miter box, the combination with a base, a back plate and a saw guide, of an L-shaped work clamp having a longitudinal slot in its supporting arm, the other arm being a work engaging arm, a supporting member therefor slidably mounted on said back plate to be adjusted toward and from said saw guide, the forward edge of said supporting member being flush with the face of the back plate, and a clamping screw for said supporting arm arranged through the slot therein, said supporting member being adapted to receive said screw in different positions whereby said work clamp may be adjustably secured with its supporting arm clamped against the face of said back plate, or against the top of said member, as desired.

5. In a miter box, the combination with a base, a back plate and a saw guide, of an L-shaped work clamp having a longitudinal slot in its supporting arm, the other being the work-engaging arm, a supporting member on said back plate, and a clamping screw for said supporting arm arranged through the slot therein, said supporting member being adapted to receive said screw in different positions whereby said work clamp may be adjustably secured with its work engaging arm in a vertical or in a horizontal position, as desired.

6. In a miter box, the combination with a base, a back plate and a saw guide, of a work clamp having a longitudinal slot in its supporting arm, a supporting member mounted on said back plate to be adjusted toward and from said saw guide, and a clamping screw for said supporting arm arranged through the slot therein, said supporting member being adapted to receive said screw in different positions whereby said work clamp may be adjustably secured with its work supporting arm in a vertical or in a horizontal position, as desired.

7. In a miter box, the combination with a base, a back plate and a saw guide, of a work clamp having a longitudinal slot in its supporting arm, a supporting member on said back plate, and a clamping screw for said supporting arm arranged through the slot therein, said supporting member being adapted to receive said screw in different positions whereby said work clamp may be adjustably secured with its work supporting arm in a vertical or in a horizontal position, as desired.

8. In a miter box, the combination with a base, a back plate and a saw guide, said back plate being provided with a vertical saw slot, a pair of L-shaped work clamps, each having longitudinal slots in its supporting arm, the other arm being the work-engaging arm, a pair of supporting members mounted on said back plate to be adjusted toward and from said saw slot therein, there being a supporting member on each side of the saw slot, the forward edges of said supporting members being flush with the face of said back plate, and clamping screws carried by said supporting members, said members being adapted to receive said screws in different positions whereby said work clamps may be adjustably secured with their work engaging arms in vertical or in horizontal positions, as desired.

9. In a miter box, the combination with a base, a back plate and a saw guide, said back plate being provided with a vertical saw slot, a pair of L-shaped work clamps, each having longitudinal slots in its supporting arm, the other arm being the work-engaging arm, a pair of supporting members mounted on said back plate, there being a supporting member on each side of the saw slot, the forward edges of said supporting members being flush with the face of said back plate, and clamping screws carried by said supporting members, said members being adapted to receive said screws in different positions whereby said work clamps may be adjustably secured with their work engaging arms in vertical or in horizontal positions, as desired.

10. In a miter box, the combination with a base, a back plate and a saw guide, said back plate being provided with a vertical saw slot, a pair of work clamps, having longitudinally slotted supporting arms, a pair of supporting members mounted on said back plate to be adjusted toward and from said saw slot therein, there being a supporting member on each side of the saw slot, and clamping screws carried by said supporting members, said members being adapted to receive said screws in different positions whereby said work clamps may be adjustably secured with their supporting arms in vertical or in horizontal positions, as desired.

11. In a miter box, the combination with a base, a back plate and a saw guide, said back plate being provided with a vertical saw slot, a pair of work clamps, having longitudinally slotted supporting arms, a pair of supporting members on said back plate, there being a supporting member on each side of the saw slot, and clamping screws carried by said supporting members adapted to be engaged with the tops or the forward edges thereof whereby said work clamps may be adjustably secured with their supporting arms in vertical or in horizontal positions, as desired.

12. A miter box comprising a base, a back plate and a saw guide; a work clamp provided with a supporting arm; a support therefor on said back plate; and a clamping screw for said supporting arm, said support being adapted to receive said screw in different positions whereby said supporting arm may be adjusted to a vertical or a horizontal position, for the purpose specified.

13. A miter box comprising a base, a back plate and a saw guide; a work clamp having a work-engaging arm; a support for said work clamp on said back plate; and means for adjustably supporting said work clamp arm on said supporting member in a horizontal or in a vertical position, as desired, and for adjusting said clamp toward and from said saw guide.

14. A miter box comprising a swinging saw guide supporting bar having opposed vertical grooves therein; saw guide posts; forked bases for said posts, adapted to engage said grooves of said bar; and set screws for said post bases.

15. A miter box comprising a swinging saw guide carrying bar; a segment having a plurality of main gage notches with auxiliary serration-like gage notches intermediate of said main notches; a latch finger piece and an engaging member, pivotally mounted on said finger piece and slidably arranged through said swinging bar, said engaging member being provided with a lug adapted to enter said main gage notches, the face of said lug being provided with gage serrations adapted to coact with the said serration-like notches of said segment.

16. A miter box comprising a swinging saw guide carrying bar; a segment having a plurality of main gage notches with auxiliary serration-like gage notches intermediate of said main notches; and a latch member with a lug adapted to enter said main gage notches, the face of said lug being provided with gage serrations adapted to coact with said serration-like notches of said segment.

17. In a miter box, the combination with a base, a back plate and a saw guide, of a pair of work clamps having longitudinally slotted supporting arms, a pair of supporting members mounted on said back plate to be adjusted thereon relative to each other, and clamping screws for said slotted supporting arms carried by said supporting members, said supporting members being adapted to receive the screws in different positions whereby said work clamps may be adjustably secured with their supporting arms in a vertical or in a horizontal position, all coacting for the purpose specified.

18. A miter box comprising a swinging saw guide bar, a segment having a downwardly-inclined notched edge, a latch member arranged through said bar and having a forwardly-inclined segment engaging portion, a latch finger piece on which said latch engaging member is mounted, and a spring arranged to urge said engaging member downwardly.

19. A miter box comprising a swinging saw guide bar, a segment having a downwardly-inclined notched edge, a latch member arranged through said bar and having a forwardly-inclined segment engaging portion, and a spring arranged to urge said latch member downwardly.

20. A miter box comprising a swinging saw guide bar, a segment having a downwardly-inclined notched edge, a reciprocating latch member having a forwardly-inclined segment engaging portion carried by said bar, said latch member being supported against lateral movement, and a spring arranged to urge said latch member downwardly.

In witness whereof, I have hereunto set my hand and seal in the presence of two witnesses.

GEORGE W. FISH. [L. S.]

Witnesses:
LUELLA G. GREENFIELD,
MARGARET L. GLASGOW.

Copies of this patent may be obtained for five cents each, by addressing the "Commissioner of Patents, Washington, D. C."